(12) United States Patent
Hirai et al.

(10) Patent No.: US 10,488,973 B2
(45) Date of Patent: Nov. 26, 2019

(54) SEMICONDUCTOR DEVICE, POSITION DETECTION DEVICE, AND CONTROL METHOD OF SEMICONDUCTOR DEVICE

(71) Applicant: Renesas Electronics Corporation, Koutou-ku, Tokyo (JP)

(72) Inventors: Masato Hirai, Tokyo (JP); Kosuke Fuwa, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 105 days.

(21) Appl. No.: 15/488,504

(22) Filed: Apr. 16, 2017

(65) Prior Publication Data

US 2017/0371478 A1 Dec. 28, 2017

(30) Foreign Application Priority Data

Jun. 28, 2016 (JP) .................................. 2016-127610

(51) Int. Cl.
*G06F 3/041* (2006.01)
*G06F 3/044* (2006.01)
*G06F 3/046* (2006.01)
*G06F 3/0354* (2013.01)

(52) U.S. Cl.
CPC ........ *G06F 3/0416* (2013.01); *G06F 3/03545* (2013.01); *G06F 3/044* (2013.01); *G06F 3/046* (2013.01); *G06F 2203/04106* (2013.01)

(58) Field of Classification Search
None
See application file for complete search history.

(56) References Cited

U.S. PATENT DOCUMENTS

| | | | |
|---|---|---|---|
| 5,466,896 | A | 11/1995 | Murakami et al. |
| 6,810,351 | B2 | 10/2004 | Katsurahira |
| 10,013,125 | B2 | 7/2018 | Kobori |

(Continued)

FOREIGN PATENT DOCUMENTS

| | | |
|---|---|---|
| JP | S58-14287 A | 1/1983 |
| JP | S60-65620 A | 4/1985 |

(Continued)

OTHER PUBLICATIONS

Office Action dated Jul. 23, 2019, in Japanese Patent Application No. 2016-127610.

*Primary Examiner* — Matthew Yeung
(74) *Attorney, Agent, or Firm* — Shapiro, Gabor and Rosenberger, PLLC

(57) ABSTRACT

A reception unit (13) sequentially selects a plurality of sensor coils and receives a signal from a position indicator via the sensor coil that has been selected, and an operational circuit (14) detects, using an amplitude value and a phase value of the signal received by the reception unit (13) via each of the plurality of sensor coils, coordinates of a position indicated by the position indicator and a writing force of the position indicator. When the sensor (20) includes a sensor capacitor, a transmission unit (12) outputs a signal to the sensor capacitor, the reception unit (13) receives a signal generated at a connecting point between the sensor capacitor and the transmission unit (12), and the operational circuit (14) detects whether a touch key corresponding to the sensor capacitor has been touched using a phase value of the signal received by the reception unit (13).

13 Claims, 15 Drawing Sheets

(56) References Cited

U.S. PATENT DOCUMENTS

| | | | |
|---|---|---|---|
| 2004/0183787 A1* | 9/2004 | Geaghan | G06F 3/044 345/173 |
| 2010/0252335 A1* | 10/2010 | Orsley | G06F 3/044 178/18.03 |
| 2015/0035797 A1* | 2/2015 | Shahparnia | G06F 3/041 345/174 |
| 2015/0277601 A1 | 10/2015 | Tahara et al. | |
| 2016/0266686 A1* | 9/2016 | Kobori | G06F 3/041 |

FOREIGN PATENT DOCUMENTS

| | | |
|---|---|---|
| JP | H03-147012 A | 6/1991 |
| JP | 6-5224 U | 1/1994 |
| JP | 2003-067124 A | 3/2003 |
| JP | 2015-041318 A | 3/2015 |
| WO | 2015/079861 A1 | 6/2015 |
| WO | 2015/083196 A1 | 6/2015 |

* cited by examiner

SEMICONDUCTOR DEVICE, POSITION DETECTION DEVICE, AND CONTROL METHOD OF SEMICONDUCTOR DEVICE

CROSS-REFERENCE TO RELATED APPLICATIONS

This application is based upon and claims the benefit of priority from Japanese patent application No. 2016-127610, filed on Jun. 28, 2016, the disclosure of which is incorporated herein in its entirety by reference.

BACKGROUND

The present invention relates to a semiconductor device, a position detection device, and a control method of the semiconductor device and can be suitably used, for example, for a semiconductor device that detects coordinates of a position indicated by a position indicator and a writing force of the position indicator and detects whether a touch key has been touched.

An electromagnetic inductive (EMR: Electro Magnetic Resonance) position detection device and position indicator (typically, a pen) are known (e.g., Japanese Unexamined Patent Application Publication No. 2003-067124).

According to Japanese Unexamined Patent Application Publication No. 2003-067124, the position detection device sequentially selects a plurality of loop coils in a case, transmits and receives a signal to and from a position indicator by electromagnetic induction via the loop coil that has been selected, and calculates an amplitude value and a phase value of the signal received from the position indicator. The position detection device detects coordinates of a position indicated by the position indicator and a writing force of the position indicator using the amplitude value and the phase value that have been calculated.

SUMMARY

In recent years, some mobile terminals such as smartphones include both a function of detecting coordinates of a position indicated by an electromagnetic inductive position indicator and a writing force of the position indicator and a function of detecting whether a touch key has been touched. The method of detecting the coordinates of the position indicated by the position indicator and the writing force of the position indicator in these mobile terminals include the method disclosed in Japanese Unexamined Patent Application Publication No. 2003-067124 stated above. On the other hand, methods of detecting whether the touch key has been touched include a method called a series resistance voltage division comparison method.

In the series resistance voltage division comparison method, a sensor capacitor is provided in a position corresponding to the touch key, a charging capacitor is gradually discharged to move an electric charge to the sensor capacitor and a comparison capacitor, and a voltage obtained as a result of voltage division carried out by the sensor capacitor and the comparison capacitor is repeatedly measured until the voltage becomes smaller than a reference voltage. When the touch key has been touched, the capacitance value of the sensor capacitor corresponding to the touch key is increased. Then the aforementioned voltage as a result of voltage division is reduced and the number of iterations is reduced. In this technique, the number of iterations is compared with the threshold, whereby it is detected whether the touch key has been touched.

In related art, the aforementioned two functions have been achieved by separate circuits, which means two integrated circuits (ICs) have been required. However, since the mobile terminals have small areas on which the ICs are supposed to be mounted, it may not be possible to actually mount the two ICs on the areas. In this case, it is difficult to achieve the two functions. Furthermore, when the two circuits that achieve the two respective functions are mounted on one IC, the chip area on the IC increases, which results in an increase in the size of the IC. In both cases, the increase in the area makes it difficult to achieve the two functions.

The other problems of the related art and the novel characteristics of the present invention will be made apparent from the descriptions of the specification and the accompanying drawings.

According to one embodiment, when a sensor includes a plurality of sensor coils, a semiconductor device sequentially selects a plurality of sensor coils, receives a signal from a position indicator via the sensor coil that has been selected, and detects, using an amplitude value and a phase value of a signal received via each of the plurality of sensor coils, coordinates of a position indicated by the position indicator and a writing force of the position indicator. When the sensor includes a sensor capacitor, the semiconductor device outputs a signal from a transmission unit to the sensor capacitor, receives a signal generated at a connecting point between the sensor capacitor and the transmission unit, and detects whether a touch key corresponding to the sensor capacitor has been touched using the phase value of the signal that has been received.

The embodiment contributes to solving the aforementioned problem.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

<Embodiment>

Figure 1:
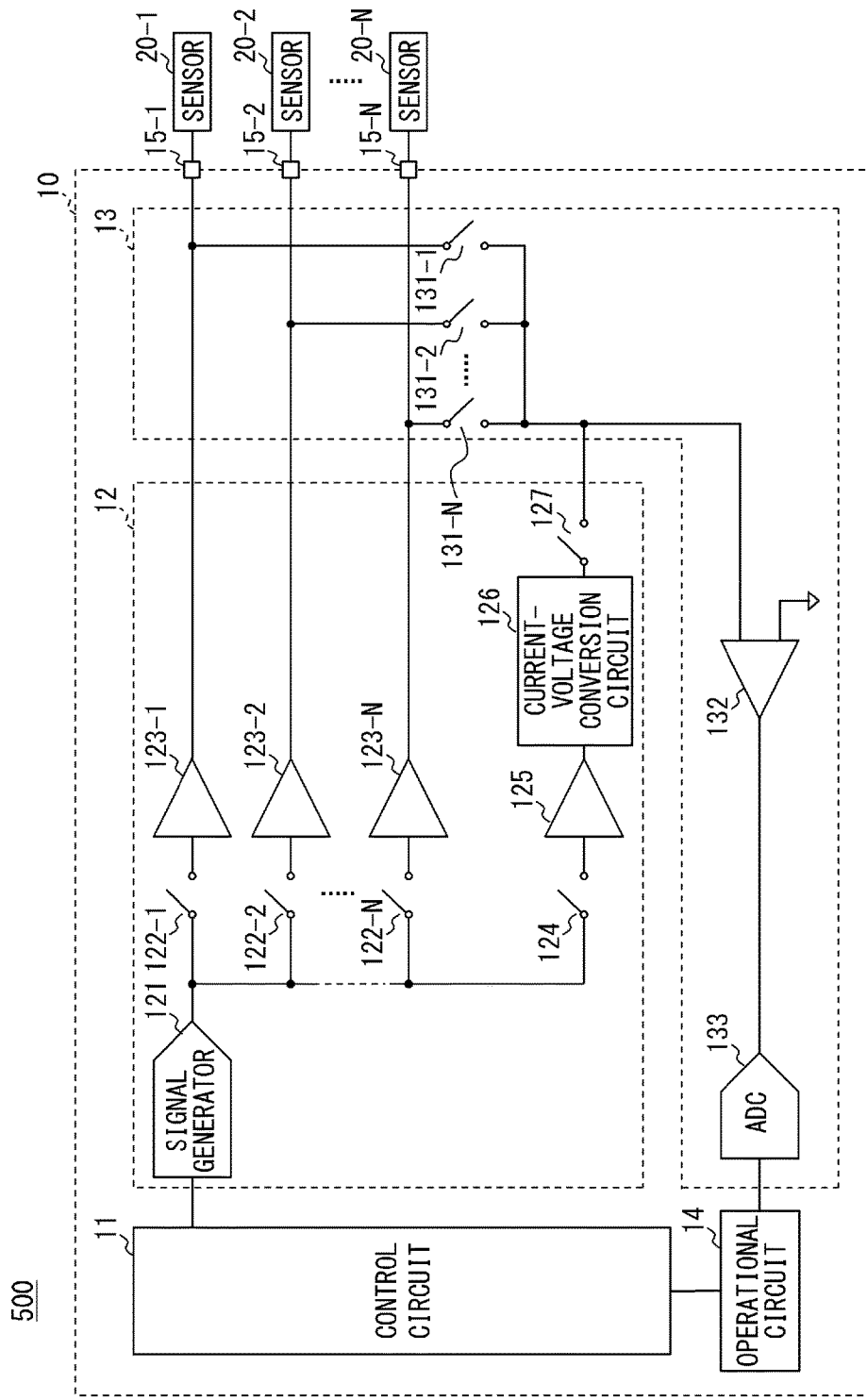
FIG. 1 is a diagram showing one example of a configuration of a position detection device according to an embodiment.

In the following description, an embodiment will be described. For the clarification of the description, the following description and the drawings may be omitted or simplified as appropriate. Further, each element shown in the drawings as functional blocks that perform various processing can be formed of a central processing unit (CPU), a memory, and other circuits in hardware and may be implemented by programs loaded in the memory in software. Those skilled in the art will therefore understand that these functional blocks may be implemented in various ways by only hardware, only software, or the combination thereof without any limitation. Throughout the drawings, the same components are denoted by the same reference symbols and overlapping descriptions will be omitted as appropriate.

Further, the above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

<Configuration of Position Detection Device 500>

First, with reference to FIG. 1, a configuration of a position detection device 500 according to this embodiment will be described. As shown in FIG. 1, the position detection device 500 according to this embodiment includes a semiconductor device 10, which is an IC or the like and N (N is an integer equal to or larger than 1) sensors 20-1-20-N for N channels (in the following description, "sensor 20" refers to any unspecified sensor).

The sensors 20-1-20-N include sensor coils or sensor capacitors. All the sensors 20-1-20-N may either be sensor coils or sensor capacitors. Alternatively, some of the sensors 20-1-20-N may be sensor coils and the others may be sensor capacitors. When N is 42, for example, 40 sensors 20 may be sensor coils and two sensors 20 may be sensor capacitors. Even when both the sensor coils and the sensor capacitors are included in the sensors 20-1-20-N, different channels need to be allocated to the sensor coils and the sensor capacitors and the sensor coils and the sensor capacitors need to be connected to input/output terminals 15-1-15-N different from one another.

The sensor coils transmit and receive signals to and from an electromagnetic induction pen 30 (see FIGS. 6 and 7) that serves as a position indicator by electromagnetic induction and the sensor coils are, for example, loop coils. The sensor coils are provided in the form of a matrix in a position detection direction in which a position indicated by the electromagnetic induction pen 30 is detected. Accordingly, when the sensors 20-1-20-N include sensor coils, a plurality of sensor coils are provided.

When the sensors 20-1-20-N include sensor coils, the semiconductor device 10 drives the sensor coils to detect coordinates of the position indicated by the electromagnetic induction pen 30 and a writing force of the electromagnetic induction pen 30.

The sensor capacitors are provided at the positions corresponding to touch keys (not shown) and when a touch key is touched, the capacitance value of the corresponding sensor capacitor is changed (increased). Accordingly, when the sensor capacitors are included in the sensors 20-1-20-N, the number of sensor capacitors to be provided is equal to the number of touch keys. That is, one or more sensor capacitors are provided to correspond to the number of touch keys. The sensor capacitors may have any configuration as long as the capacitance value thereof is changed when the touch key is touched and are not limited to the sensor capacitors dedicated for the touch keys. Specific operations are allocated to the respective touch keys and when one touch key is touched, the specific operation allocated to the touch key is performed.

When the sensors 20-1-20-N include the sensor capacitor, the semiconductor device 10 drives the sensor capacitor and detects whether the touch key corresponding to the sensor capacitor has been touched.

<Configuration of Semiconductor Device 10>

The semiconductor device 10 includes a control circuit 11, a transmission unit 12, a reception unit 13, an operational circuit 14, and N input/output terminals 15-1-15-N (in the following description, "input/output terminal 15" refers to any unspecified input/output terminal).

The input/output terminals 15-1-15-N are provided to correspond to the sensors 20-1-20-N, respectively, and are connected to the respective sensors 20.

The transmission unit 12 includes a signal generator 121, N transmission channel selection switches 122-1-122-N (in the following description, "transmission channel selection switch 122" refers to any unspecified transmission channel selection switch), N current drivers 123-1-123-N (in the following description, "current driver 123" refers to any unspecified current driver), a transmission switch for calibration (hereinafter calibration may be referred to as CAL) 124, a current driver for CAL 125, a current-voltage conversion circuit 126, and a reception switch for CAL 127. The current driver 123 is one example of a second current driver and the current driver for CAL 125 is one example of a first current driver.

The signal generator 121 generates a voltage sine wave signal.

The transmission channel selection switches 122-1-122-N are provided to correspond to the sensors 20-1-20-N, respectively. When one of the sensors 20-1-20-N is selected by the transmission unit 12 at a time a transmission operation with the electromagnetic induction pen 30 is performed, the transmission channel selection switch 122 corresponding to the sensor 20 that has been selected is turned on (close state). Accordingly, the input of the current driver 123 corresponding to the sensor 20 that has been selected and the output of the signal generator 121 are connected to each other.

The current drivers 123-1-123-N are provided to correspond to the sensors 20-1-20-N, respectively. When the current drivers 123-1-123-N are connected to the signal generator 121, the current drivers 123-1-123-N convert the voltage sine wave signal that has been generated by the signal generator 121 into a current sine wave signal and output the current sine wave signal after the conversion to the corresponding sensor 20 via the input/output terminal 15.

The transmission switch for CAL 124 is turned on (close state) at a time a calibration operation is performed and a touch key detection operation is performed. Accordingly, the input of the current driver for CAL 125 and the output of the signal generator 121 are connected to each other.

When the current driver for CAL 125 is connected to the signal generator 121, the current driver for CAL 125 converts the voltage sine wave signal generated by the signal generator 121 into a current sine wave signal and outputs the current sine wave signal after the conversion to the current-voltage conversion circuit 126.

The current-voltage conversion circuit 126 converts the current sine wave signal output from the current driver for CAL 125 into a voltage sine wave signal and outputs the voltage sine wave signal after the conversion to the reception switch for CAL 127.

The reception switch for CAL 127 is turned on (close state) at the time the calibration operation is performed and the touch key detection operation is performed. Accordingly, the input of a pre-amplifier 132 in the reception unit 13 and the output of the current-voltage conversion circuit 126 are connected to each other.

The reception unit 13 includes N reception channel selection switches 131-1-131-N (in the following description, "reception channel selection switch 131" refers to any unspecified reception channel selection switch), the pre-amplifier 132, and an A/D converter (analog-to-digital converter: hereinafter the A/D converter will be referred to as an ADC) 133.

The reception channel selection switches 131-1-131-N are respectively provided to correspond to the sensors 20-1-20-N. When one of the sensors 20-1 to 20-N is selected by the reception unit 13 at a time a reception operation with the electromagnetic induction pen 30 is performed and the touch key detection operation is performed, the reception channel selection switch 131 corresponding to the sensor 20 that has been selected is turned ON (close state). Accordingly, the sensor 20 that has been selected and the input of the pre-amplifier 132 are connected to each other via the input/output terminal 15.

When the pre-amplifier 132 is connected to the sensor 20 that has been selected, the pre-amplifier 132 amplifies the voltage sine wave signal received by the sensor 20 that has been selected and outputs the amplified signal to the ADC 133. Further, when the pre-amplifier 132 is connected to the current-voltage conversion circuit 126, the pre-amplifier 132 amplifies the voltage sine wave signal that has been converted by the current-voltage conversion circuit 126 and outputs the amplified signal to the ADC 133. Further, when the pre-amplifier 132 is connected to the sensor 20 that has been selected and the current-voltage conversion circuit 126, the pre-amplifier 132 receives a signal generated at the connecting point between the sensor 20 that has been selected and the current-voltage conversion circuit 126, amplifies the voltage sine wave signal that has been received, and outputs the resulting signal to the ADC 133.

The ADC 133 digitizes the voltage sine wave signal that has been output from the pre-amplifier 132 and outputs the sine wave digital signal that has been digitized to the operational circuit 14.

The operational circuit 14 performs an operation such as Discrete Fourier Transform (DFT) on the sine wave digital signal output from the ADC 133. The operational circuit 14 detects, based on the result of the operation, coordinates of the position indicated by the electromagnetic induction pen 30 and the writing force of the electromagnetic induction pen 30 and detects whether the touch key has been touched. The details of this detection method will be described later.

The control circuit 11 controls the elements in the semiconductor device 10. The control circuit 11 controls, for example, ON (close state)/OFF (open state) of the transmission channel selection switches 122-1-122-N, the transmission switch for CAL 124, the reception switch for CAL 127, and the reception channel selection switches 131-1-131-N.

<Configuration of Current Drivers 123-1-123-N>

Next, with reference to FIG. 2, a configuration of the current drivers 123-1-123-N according to this embodiment will be described.

Figure 2:
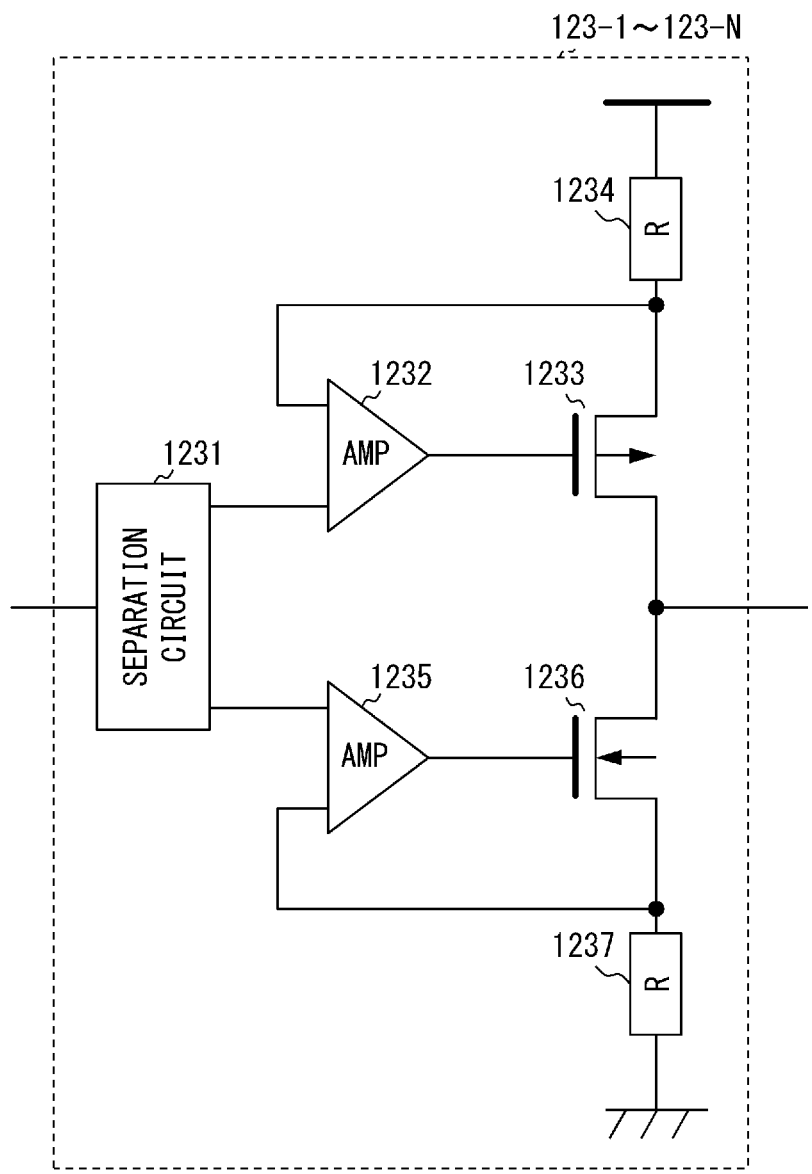
FIG. 2 is a diagram showing one example of a configuration of a current driver according to the embodiment.

As shown in FIG. 2, the current drivers 123-1-123-N each include a separation circuit 1231, operational amplifiers 1232 and 1235, driver transistors 1233 and 1236, and resistance elements 1234 and 1237.

The separation circuit 1231 separates the voltage sine wave signal generated by the signal generator 121 into a positive half wave signal and a negative half wave signal, outputs one of the positive and negative half wave signals to the operational amplifier 1232, and outputs the other one of the positive and negative half wave signals to the operational amplifier 1235.

The operational amplifier 1232 controls the voltage corresponding to the half wave signal output from the separation circuit 1231 so that the voltage is applied to the lower end of the resistance element 1234. A current having a potential difference divided by the corresponding resistance of the resistance element 1234 flows through the resistance element 1234.

The operational amplifier 1235 controls the voltage corresponding to the half wave signal output from the separation circuit 1231 so that the voltage is applied to the upper end of the resistance element 1237. A current having a potential difference divided by the corresponding resistance of the resistance element 1237 flows through the resistance element 1237.

The current that flows through the resistance element 1234 and the current that flows through the resistance element 1237 are combined with each other at the connecting point of the driver transistor 1233 and the driver transistor 1236 via the driver transistor 1233 and the driver transistor 1236, respectively. This combined current is output to the subsequent corresponding sensor 20 as the current sine wave signal.

Note that the configuration of the current drivers 123-1-123-N shown in FIG. 2 is merely one example and is not limited to this example.

<Configurations of Current Driver for CAL 125 and Current-Voltage Conversion Circuit 126>

Figure 3:
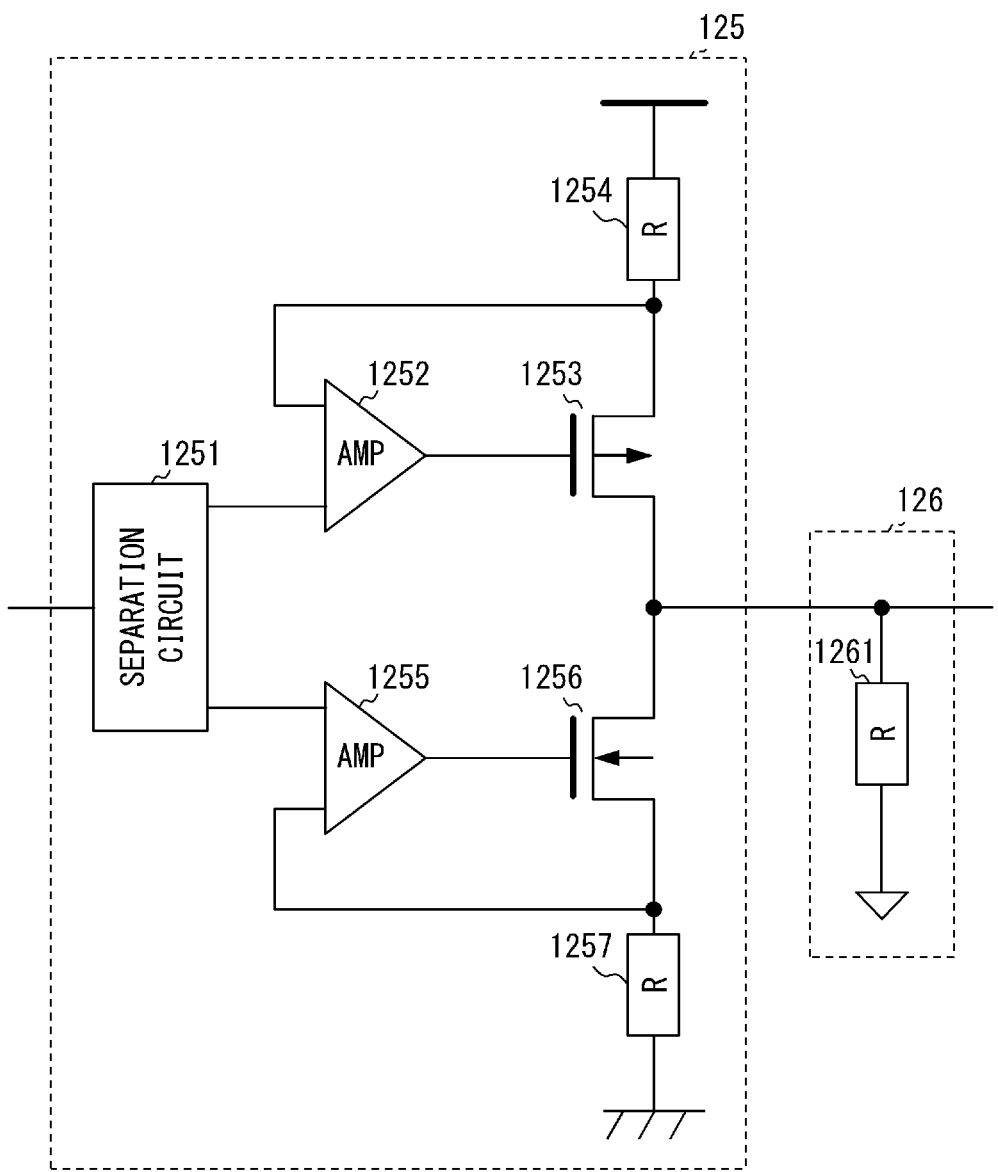
FIG. 3 is a diagram showing one example of configurations of a current driver for CAL and a current-voltage conversion circuit according to the embodiment.

With reference next to FIG. 3, configurations of the current driver for CAL 125 and the current-voltage conversion circuit 126 according to this embodiment will be described.

As shown in FIG. 3, the configuration of the current driver for CAL 125 is similar to that of the current drivers 123-1-123-N shown in FIG. 2. That is, the current driver for CAL 125 includes a separation circuit 1251, operational amplifiers 1252 and 1255, driver transistors 1253 and 1256, and resistance elements 1254 and 1257 respectively corresponding to the separation circuit 1231, the operational amplifiers 1232 and 1235, the driver transistors 1233 and 1236, and the resistance elements 1234 and 1237 shown in FIG. 2.

The current-voltage conversion circuit 126 includes a resistance element 1261 to convert the current output from the current driver for CAL 125 into a voltage.

The configurations of the current driver for CAL 125 and the current-voltage conversion circuit 126 shown in FIG. 3 are merely examples and are not limited to them.

<Operation of Driving Sensor Coil 21>

In the following description, an operation of the semiconductor device 10 according to this embodiment will be described.

First, an operation of driving the sensor coil as the sensor 20 to detect the coordinates of the position indicated by the electromagnetic induction pen 30 and the writing force of the electromagnetic induction pen 30 will be described. In this example, it is assumed that all the sensors 20-1-20-N are sensor coils and the sensors 20-1-20-N are referred to as sensor coils 21-1-21-N (in the following description, "sensor coil 21" refers to any unspecified sensor coil) for the sake of convenience of the description.

<Schematic Flow of Operation of Driving Sensor Coil 21>

Figure 4:
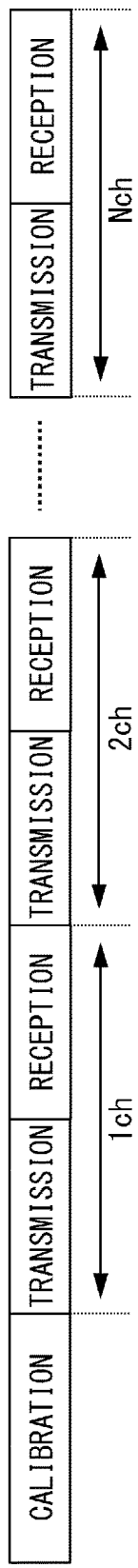
FIG. 4 is a diagram showing one example of a schematic flow of an operation of driving a sensor coil by a semiconductor device according to the embodiment.

Referring first to FIG. 4, a schematic flow of an operation of driving the sensor coil 21 of the semiconductor device 10 according to this embodiment will be described.

As shown in FIG. 4, first, the semiconductor device 10 performs calibration to obtain an amplitude reference value and a phase reference value of a signal. Then the semiconductor device 10 sequentially selects the N sensor coils 21-1-21-N for the N channels one by one, transmits/receives a signal between the sensor coil 21 that has been selected and the electromagnetic induction pen 30 by electromagnetic induction, and calculates the amplitude value and the phase value of the signal received by the reception unit 13 from the electromagnetic induction pen 30 via the sensor coil 21 that has been selected. After the transmission and the reception in each of the N sensor coils 21-1-21-N are completed, the semiconductor device 10 detects the coordinates of the position indicated by the electromagnetic induction pen 30 and the writing force of the electromagnetic induction pen 30 using the phase reference value obtained by the calibration and the amplitude value and the phase value of the signal received by each of the sensor coils 21-1-21-N.

<Calibration Operation when Sensor Coil 21 is Driven>

Figure 5:
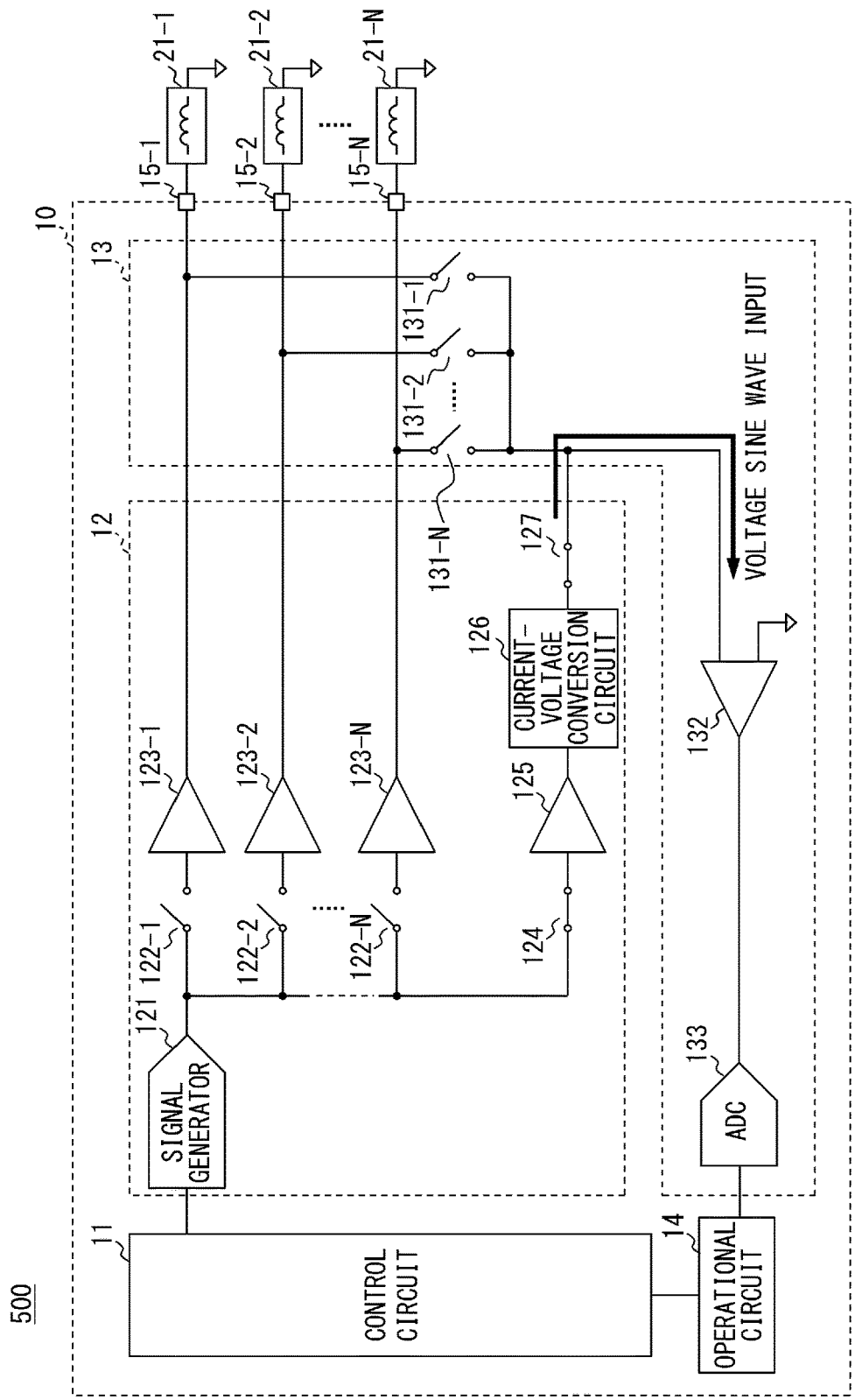
FIG. 5 is a diagram showing one example of a calibration operation when the sensor coil is driven by the semiconductor device according to the embodiment.

With reference next to FIG. 5, the calibration operation when the sensor coil 21 is driven by the semiconductor device 10 according to this embodiment will be described.

As shown in FIG. 5, when the calibration operation is performed, the transmission unit 12 turns on (close state) the transmission switch for CAL 124 and the reception switch for CAL 127 under the control of the control circuit 11. At this time, the control circuit 11 turns off (open state) all the other transmission channel selection switches 122-1-122-N and the reception channel selection switches 131-1-131-N.

In this state, the signal generator 121 generates a voltage sine wave signal under the control of the control circuit 11. Then the voltage sine wave signal generated by the signal generator 121 is converted into a current sine wave signal by the current driver for CAL 125, the current sine wave signal is again converted into a voltage sine wave signal by the current-voltage conversion circuit 126, and the voltage sine wave signal after the conversion is input to the reception unit 13.

The voltage sine wave signal input to the reception unit 13 is amplified by the pre-amplifier 132 and then the amplified signal is converted into a sine wave digital signal by the ADC 133. The operational circuit 14 performs DFT on the sine wave digital signal converted by the ADC 133, to thereby calculate the amplitude value and the phase value of the signal input from the transmission unit 12 and hold the amplitude value and the phase value that have been calculated as the amplitude reference value and the phase reference value, respectively. Since the details of the method of calculating the amplitude value and the phase value have already been disclosed in, for example, Japanese Unexamined Patent Application Publication No. 03-147012, descriptions thereof will be omitted.

<Transmission/Reception Operations with Electromagnetic Induction Pen 30 when Sensor Coil 21 is Driven>

Figure 6:
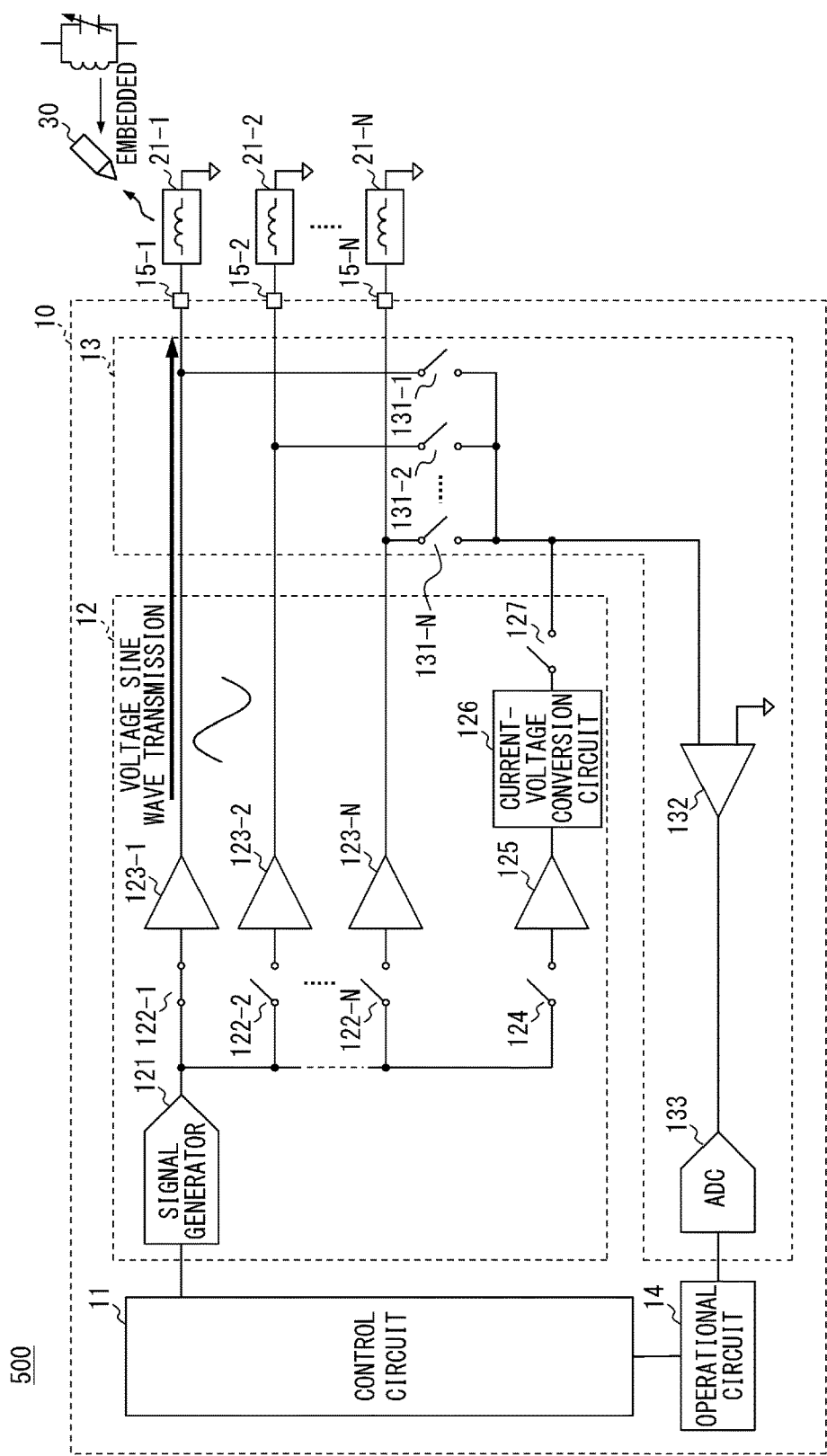
FIG. 6 is a diagram showing one example of a transmission operation with an electromagnetic induction pen when the sensor coil is driven by the semiconductor device according to the embodiment.
Figure 7:
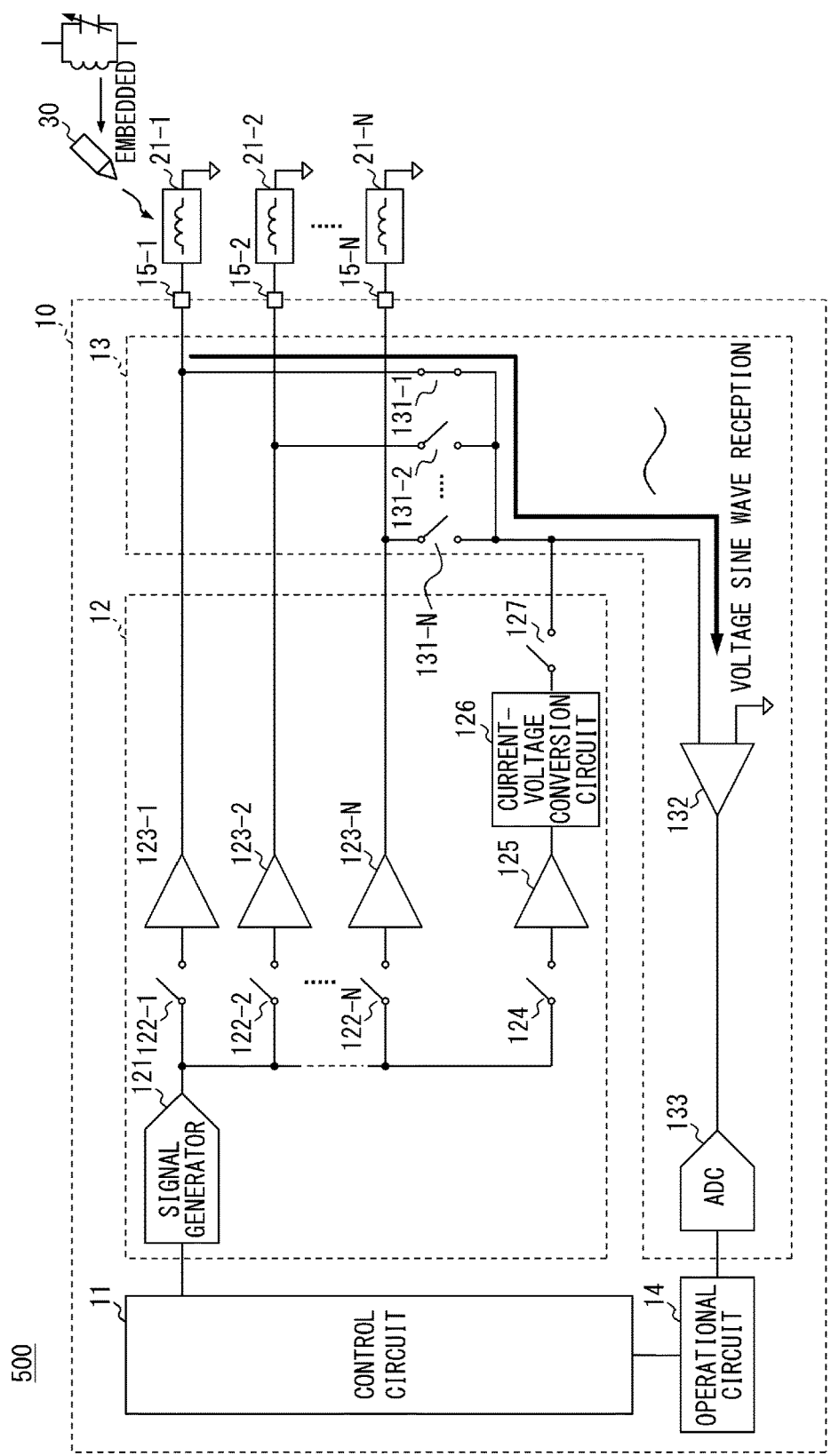
FIG. 7 is a diagram showing one example of a reception operation with the electromagnetic induction pen when the sensor coil is driven by the semiconductor device according to the embodiment.

With reference next to FIGS. 6 and 7, transmission/reception operations with the electromagnetic induction pen 30 when the sensor coil 21 is driven by the semiconductor device 10 according to this embodiment will be described. FIGS. 6 and 7 show transmission/reception operations with the electromagnetic induction pen 30 when the sensor coil 21-1 of a first channel is selected.

As shown in FIGS. 6 and 7, the electromagnetic induction pen 30 includes a pen circuit in which a coil and a variable capacitor are connected in parallel embedded therein. When a writing force is applied to the tip of the pen, the capacitance of the variable capacitor is changed. That is, the electromagnetic induction pen 30 has such a configuration that the resonance frequency thereof is changed when the writing force is applied to the tip of the pen.

As shown in FIG. 6, at the time the transmission operation with the electromagnetic induction pen 30 is performed by the sensor coil 21-1, the transmission unit 12 selects the sensor coil 21-1 under the control of the control circuit 11 and turns on (close state) the transmission channel selection switch 122-1 corresponding to the sensor coil 21-1 that has been selected. In this case, the control circuit 11 turns off (open state) all the other transmission channel selection switches 122-2-122-N, the transmission switch for CAL 124, the reception switch for CAL 127, and the reception channel selection switches 131-1-131-N.

In this state, the signal generator 121 generates the voltage sine wave signal under the control of the control circuit 11. Then the voltage sine wave signal that has been generated by the signal generator 121 is converted into the current sine wave signal by the current driver 123-1 and the current sine wave signal is output to the sensor coil 21-1 via the input/output terminal 15-1.

At this time, when the electromagnetic induction pen 30 is made close to the position detection device 500, electromagnetic induction is generated, with the sensor coil 21-1 being used as a primary coil and the electromagnetic induction pen 30 being used as a secondary coil. Accordingly, a voltage of the resonance frequency in accordance with the coil of the pen circuit that is embedded in the electromagnetic induction pen 30 and the variable capacitor is generated in the electromagnetic induction pen 30. After that, the reception operation by the sensor coil 21-1 is performed.

As shown in FIG. 7, at the time the reception operation with the electromagnetic induction pen 30 is performed by the sensor coil 21-1, the reception unit 13 selects the sensor coil 21-1 selected by the transmission unit 12 under the control of the control circuit 11 and turns on (closed state) the reception channel selection switch 131-1 corresponding to the sensor coil 21-1 that has been selected. In this case, the control circuit 11 turns off (open state) all the other transmission channel selection switches 122-1-122-N, the transmission switch for CAL 124, the reception switch for CAL 127, and the reception channel selection switches 131-2-131-N.

At this point, a voltage is generated in the electromagnetic induction pen 30, as stated above. Therefore, at this time, electromagnetic induction is generated, with the electromagnetic induction pen 30 being used as the primary coil and the sensor coil 21-1 being used as the secondary coil. The voltage generated by the electromagnetic induction is received by the sensor coil 21-1 as a voltage sine wave signal and then input to the reception unit 13 via the input/output terminal 15-1.

The voltage sine wave signal that has been input to the reception unit 13 is amplified by the pre-amplifier 132 and then the amplified signal is converted into a sine wave digital signal by the ADC 133. The operational circuit 14 performs DFT on the sine wave digital signal converted by the ADC 133, whereby the operational circuit 14 calculates the amplitude value and the phase value of the signal received by the sensor coil 21-1.

<Operation of Detecting Electromagnetic Induction Pen 30 when Sensor Coil 21 is Driven>

After the transmission/reception operations in each of the N sensor coils 21-1-21-N are completed, the operational circuit 14 detects the coordinates of the position indicated by the electromagnetic induction pen 30 using the amplitude values obtained in the respective transmission/reception operations and further detects the wiring force of the electromagnetic induction pen 30 using a phase difference between the phase values obtained in the respective transmission/reception operations and the phase reference value obtained in the calibration operation.

The coordinates of the position indicated by the electromagnetic induction pen 30 can be detected, for example, using a property that the amplitude value becomes larger as the distance between the sensor coils 21 and the electromagnetic induction pen 30 becomes closer. Various methods may be employed as the detection method. For example, first, the transmission/reception operations are performed in all the N sensor coils 21-1-21-N (all scanning) and then the transmission/reception operations are performed only in the sensor coil 21 which has exhibited a large amplitude value as a result of the all scanning and the neighboring sensor coils 21 (sector scanning), and the coordinates can be detected using the amplitude value obtained in the sector scanning.

On the other hand, unlike the amplitude value, the phase value shows similar values among the sensor coils 21. Therefore, the writing force of the electromagnetic induction pen 30 can be detected using the phase difference obtained in the transmission/reception operations of a desired sensor coil 21. Accordingly, the writing force of the electromagnetic induction pen 30 can be detected by using, for example, only the phase difference obtained by sector scanning.

The aforementioned operation of driving the sensor coil 21 is similar to the operation of the semiconductor device for the electromagnetic inductive position detection device according to related art.

That is, the semiconductor device 10 according to this embodiment includes a configuration similar to that of the semiconductor device according to related art and detects the coordinates of the position indicated by the electromagnetic induction pen 30 and the writing force of the electromagnetic induction pen 30 in an operation similar to that of the semiconductor device according to related art. Besides, the semiconductor device 10 according to this embodiment is able to detect whether the touch key has been touched as follows.

<Operation of Driving Sensor Capacitor 22>

Next, an operation of driving the sensor capacitor as the sensor 20 to detect whether the touch key has been touched will be described. In this example, it is assumed that all the sensors 20-1-20-N are sensor capacitors and the sensors 20-1-20-N are referred to as sensor capacitors 22-1-22-N (in the following description, "sensor capacitor 22" refers to any unspecified sensor capacitor) for the sake of convenience of the description.

<Schematic Flow of Operation of Driving Sensor Capacitor 22>

Figure 8:
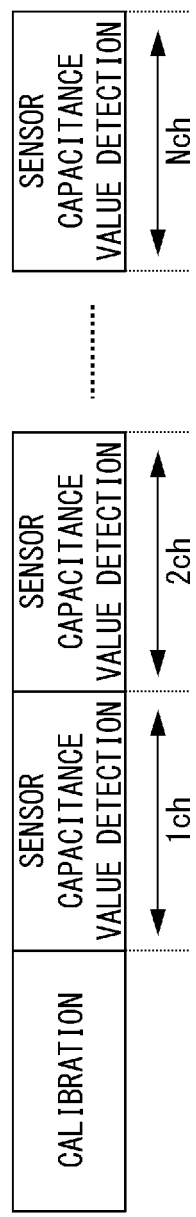
FIG. 8 is a diagram showing one example of a schematic flow of an operation of driving a sensor capacitor by the semiconductor device according to the embodiment.

Referring first to FIG. 8, a schematic flow of the operation of driving the sensor capacitor 22 by the semiconductor device 10 according to this embodiment will be described.

As shown in FIG. 8, first, the semiconductor device 10 performs calibration to obtain the amplitude reference value and the phase reference value of the signal. Then the semiconductor device 10 sequentially selects the N sensor capacitors 22-1-22-N for N channels one by one, outputs the signal from the transmission unit 12 to the sensor capacitor 22 that has been selected, receives, by the reception unit 13, the signal that has been generated at the connecting point of the sensor capacitor 22 that has been selected and the transmission unit 12, and calculates the phase value of the signal received by the reception unit 13. Then the semiconductor device 10 detects whether the capacitance value of the sensor capacitor 22 that has been selected has been changed, that is, whether the touch key corresponding to the sensor capacitor 22 that has been selected has been touched using the phase difference between the phase value that has been calculated and the phase reference value obtained by the calibration.

<Calibration Operation when Sensor Capacitor 22 is Driven>

Since a calibration operation when the sensor capacitor 22 is driven by the semiconductor device 10 according to this embodiment is similar to the calibration operation described with reference to FIG. 5, descriptions thereof will be omitted.

<Operation of Detecting Capacitance Value when Sensor Capacitor 22 is Driven>

Figure 9:
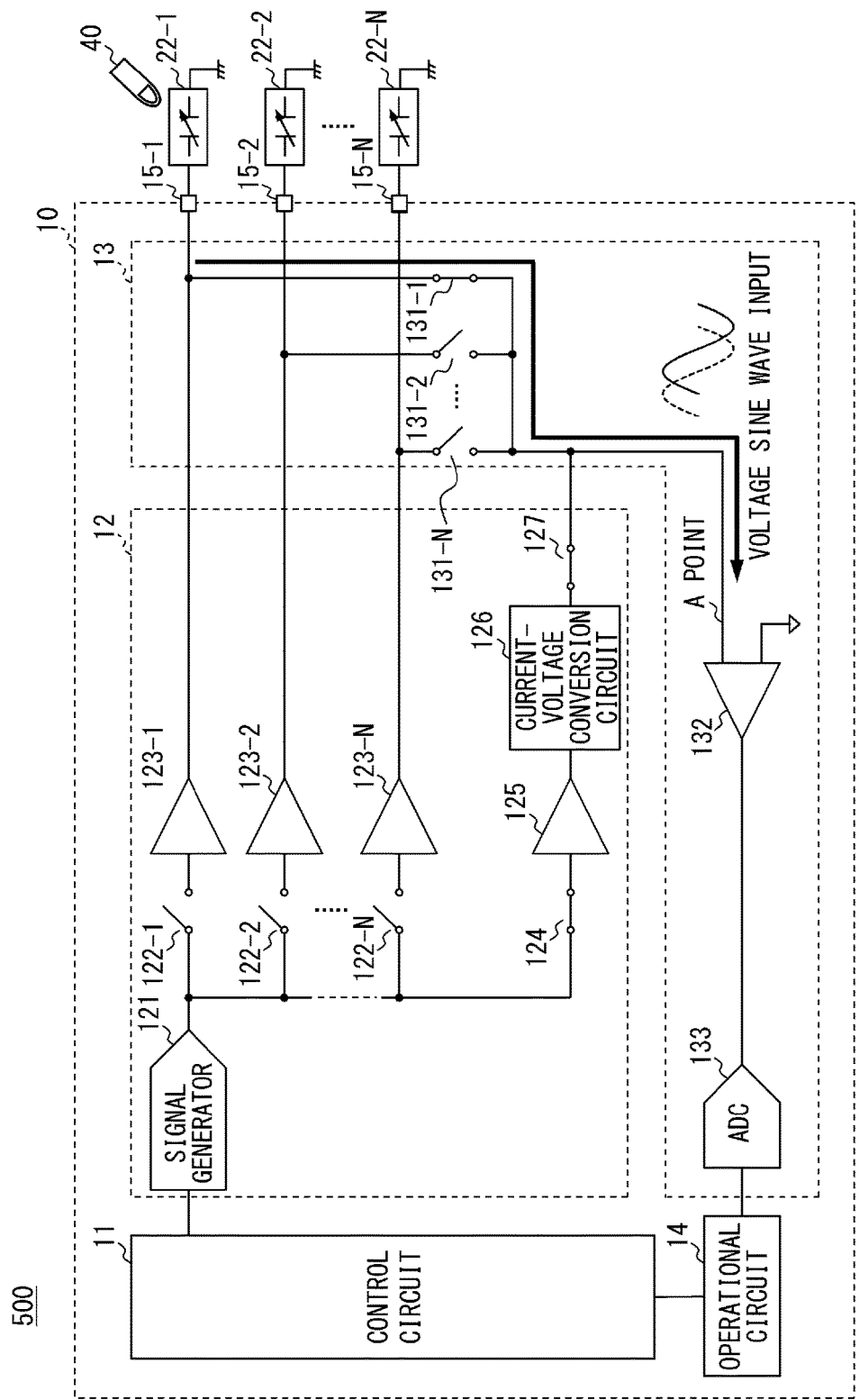
FIG. 9 is a diagram showing one example of an operation of detecting a capacitance value of the sensor capacitor at a time the sensor capacitor is driven by the semiconductor device according to the embodiment.

With reference next to FIG. 9, an operation of detecting the capacitance value of the sensor capacitor 22 when the sensor capacitor 22 is driven by the semiconductor device 10 according to this embodiment will be described. FIG. 9 shows an operation of detecting the capacitance value of the sensor capacitor 22-1 when the sensor capacitor 22-1 of the first channel is selected.

As shown in FIG. 9, in the operation of detecting the capacitance value of the sensor capacitor 22-1, the transmission unit 12 turns on (close state) the transmission switch for CAL 124 and the reception switch for CAL 127 under the control of the control circuit 11. Further, the reception unit 13 selects the sensor capacitor 22-1 under the control of the control circuit 11 and turns on (closed state) the reception channel selection switch 131-1 corresponding to the sensor capacitor 22-1 that has been selected. In this case, the control circuit 11 turns off (open state) all the other transmission channel selection switches 122-1-122-N and the reception channel selection switches 131-2-131-N.

In this state, the signal generator 121 generates a voltage sine wave signal under the control of the control circuit 11. Then the voltage sine wave signal generated by the signal generator 121 is converted into a current sine wave signal by the current driver for CAL 125, the obtained signal is converted again into a voltage sine wave signal by the current-voltage conversion circuit 126, and the voltage sine wave signal after the conversion is output to the sensor capacitor 22-1 via the input/output terminal 15-1. At this time, the ON resistance of the reception switch for CAL 127 and the sensor capacitor 22-1 constitute a low pass filter (LPF). Therefore, depending on the characteristics of the LPF, the phase of the voltage sine wave signal at an A point generated at the connecting point between the sensor capacitor 22-1 and the transmission unit 12 is changed.

The voltage sine wave signal at the A point is amplified by the pre-amplifier 132 and the amplified signal is converted into a sine wave digital signal by the ADC 133. The operational circuit 14 performs DFT on the sine wave digital signal converted by the ADC 133, whereby the operational circuit 14 calculates the phase value of the voltage sine wave signal at the A point and further calculates the phase difference between the phase value that has been calculated and the phase reference value obtained in the calibration operation.

Figure 10:
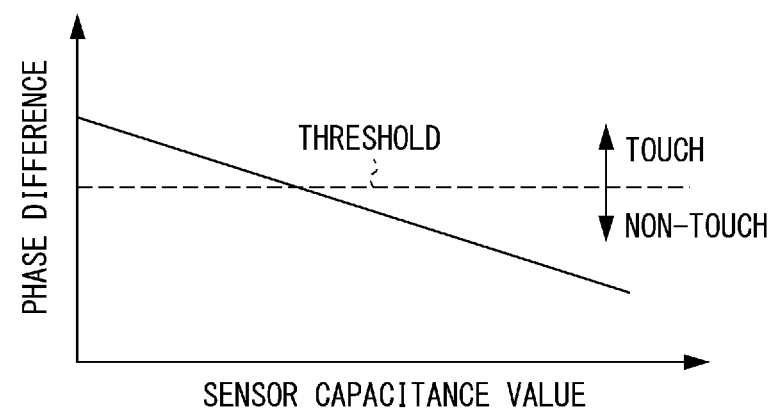
FIG. 10 is a diagram showing one example of a method of determining whether a touch key has been touched by the semiconductor device according to the embodiment.

When the touch key corresponding to the sensor capacitor 22-1 is touched by a finger 40 or the like, the capacitance value of the sensor capacitor 22-1 is changed (increased). Then the frequency characteristics of the LPF composed of the sensor capacitor 22-1 and the ON resistance of the reception switch for CAL 127 are changed, which causes a change in the phase difference calculated above. The relation between the capacitance value of the sensor capacitor 22-1 and the phase difference is, for example, as shown in FIG. 10. Accordingly, it becomes possible to detect the capacitance value of the sensor capacitor 22-1 by calculating the aforementioned phase difference.

<Operation of Detecting Touch Key when Sensor Capacitor 22 is Driven>

As described above, in this embodiment, it is possible to detect the capacitance value of the sensor capacitor 22-1 by calculating the aforementioned phase difference. In other words, the change in the capacitance value of the sensor capacitor 22-1 can be detected as the phase difference.

The operational circuit 14 detects, based on the phase difference calculated above, whether the capacitance value of the sensor capacitor 22-1 has been changed, that is, whether the touch key corresponding to the sensor capacitor 22-1 has been touched. The operational circuit 14 determines whether the touch key has been touched by comparing the phase difference calculated above with a predetermined threshold, as shown in FIG. 10. Specifically, when the phase difference is equal to or larger than the threshold, the operational circuit 14 determines that the touch key has been touched and when the phase difference is smaller than the threshold, the operational circuit 14 determines that the touch key has not been touched.

While the resistance components that constitute the LPF are the ON resistance of the reception switch for CAL 127 in this embodiment, this embodiment is not limited to this example. The resistance components that constitute the LPF may either be resistance components of the current-voltage conversion circuit 126 or parasitic resistance components on the line in the output stage of the transmission unit 12.

<Configuration of Mobile Terminal 600 on which Position Detection Device 500 is Mounted>

The position detection device 500 according to this embodiment can be mounted, for example, on a mobile terminal such as a smartphone.

Figure 11:
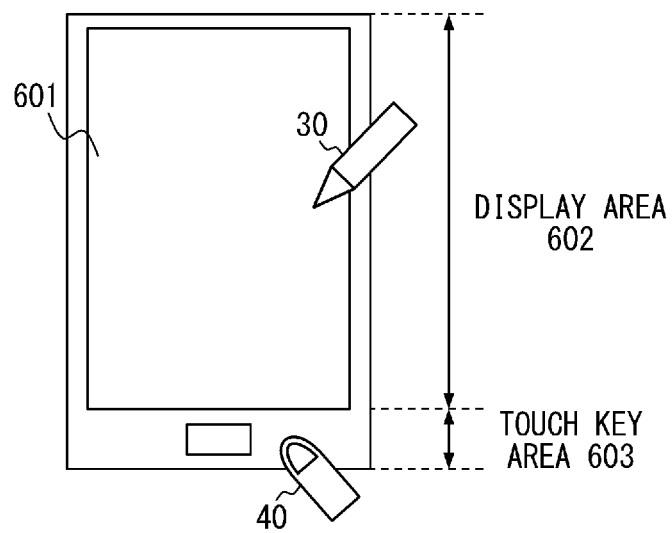
FIG. 11 is a diagram showing one example of an external configuration of a mobile terminal on which the position detection device according to the embodiment is mounted.
Figure 12:
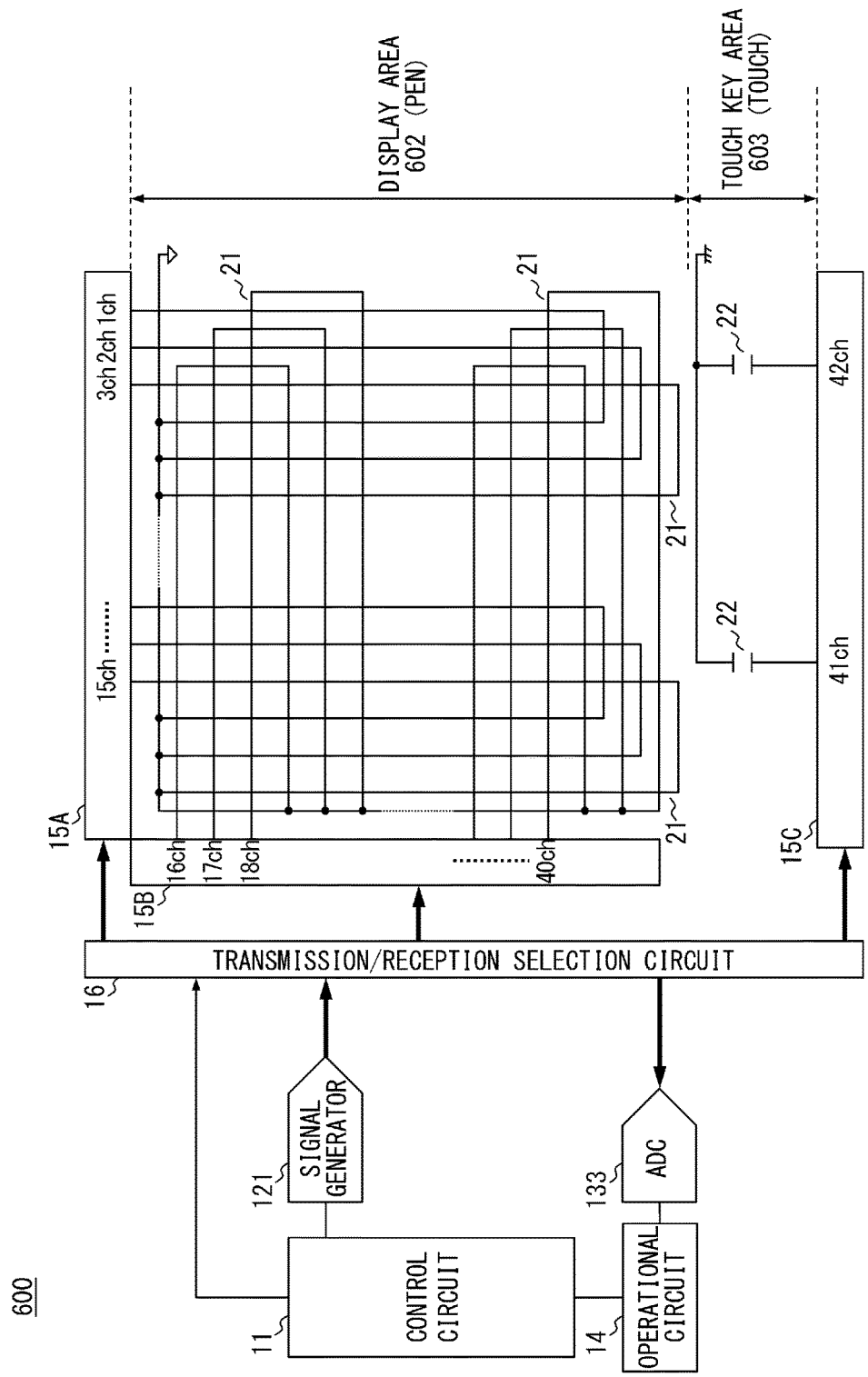
FIG. 12 is a diagram showing one example of an internal configuration of the mobile terminal on which the position detection device according to the embodiment is mounted.

With reference next to FIGS. 11 and 12, a configuration of a mobile terminal 600 on which the position detection device 500 according to this embodiment is mounted will be described.

As shown in FIGS. 11 and 12, the mobile terminal 600 on which the position detection device 500 according to this embodiment is mounted is, for example, a terminal such as a smartphone that includes a display screen 601. Further, the mobile terminal 600 includes a display area 602, which corresponds to the display screen 601, and a touch key area 603, which corresponds to the lower part of the display screen 601. The display area 602 includes a plurality of sensor coils 21 provided in the form of a matrix in the position detection direction of the electromagnetic induction pen 30 and is an area in which the coordinates of the position indicated by the electromagnetic induction pen 30 and the writing force of the electromagnetic induction pen 30 can be detected. The touch key area 603 includes the touch keys and sensor capacitors 22 provided in the positions corresponding to the touch keys and is an area in which it is possible to detect whether the touch key has been touched by the finger 40 or the like.

The example shown in FIG. 12 is an example in which 40 sensor coils 21 for 40 channels and two sensor capacitors 22 for two channels are provided when N=42 in FIG. 1. Specifically, in the display area 602, 15 sensor coils 21 for 15 channels are provided in the X direction (horizontal direction in FIG. 12, the same is applied to the following description) and 25 sensor coils 21 for 25 channels are provided in the Y direction (vertical direction in FIG. 12, the same is applied to the following description). Accordingly, the display area 602 is able to detect the coordinates of the position indicated by the electromagnetic induction pen 30 and the writing force of the electromagnetic induction pen 30. Further, the touch key area 603 includes two sensor capacitors 22 for two channels provided in the X direction. The touch key area 603 is therefore able to detect whether the touch key has been touched by the finger 40 or the like. In this way, while the mobile terminal 600 includes both the sensor coils 21 and the sensor capacitors 22, different channels are allocated to the sensor coils 21 and the sensor capacitors 22 and the sensor coils 21 and the sensor capacitors 22 are connected to the input/output terminals 15 different from one another.

In FIG. 12, the parts composed of the components other than the sensor coils 21 and the sensor capacitors 22 correspond to the semiconductor device 10 shown in FIG. 1. Further, input/output terminal groups 15A, 15B, and 15C include the input/output terminal 15 of the corresponding channel among the input/output terminals 15 shown in FIG. 1. Further, the transmission/reception selection circuit 16 includes the elements other than the signal generator 121 in the transmission unit 12 in FIG. 1 and the elements other than the ADC 133 in the reception unit 13 in FIG. 1. The current driver 123 may not be necessarily included in the transmission/reception selection circuit 16 and may be included in the input/output terminal groups 15A, 15B, and 15C.

<Operation of Mobile Terminal 600 on which Position Detection Device 500 is Mounted>

Figure 13:
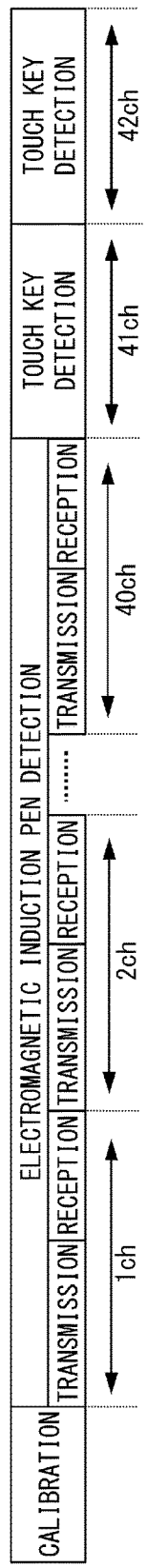
FIG. 13 is a diagram showing one example of a schematic flow of an operation of driving the sensor coil and the sensor capacitor by the mobile terminal on which the position detection device according to the embodiment is mounted.

With reference next to FIG. 13, a schematic flow of an operation of driving the sensor coils 21 and the sensor capacitors 22 by the mobile terminal 600 shown in FIGS. 11 and 12 will be described.

As shown in FIG. 13, first, the semiconductor device 10 performs calibration to obtain the amplitude reference value and the phase reference value of the signal. Then the semiconductor device 10 sequentially selects 40 sensor coils 21 for 40 channels one by one, transmits and receives signals to and from the sensor coil 21 that has been selected and the electromagnetic induction pen 30 by electromagnetic induction, and calculates the amplitude value and the phase value of the signal received by the reception unit 13 from the electromagnetic induction pen 30 via the sensor coil 21 that has been selected. After the transmission and the reception in each of 40 sensor coils 21 are completed, the semiconductor device 10 detects the coordinates of the position indicated by the electromagnetic induction pen 30 and the writing force of the electromagnetic induction pen 30 using the phase reference value obtained by the calibration and the amplitude value and the phase value of the signal received by each of the 40 sensor coils 21. Then the semiconductor device 10 sequentially selects two sensor capacitors 22 for two channels one by one, outputs the signal to the sensor capacitor 22 that has been selected, receives the signal that has been generated at the connecting point between the sensor capacitor 22 that has been selected and the transmission unit 12, and calculates the phase value of the signal that has been received. Then the semiconductor device 10 detects whether the touch key corresponding to the sensor capacitor 22 that has been selected has been touched using the phase difference between the phase value that has been calculated and the phase reference value obtained by the calibration.

Since a calibration operation, an operation of driving the sensor coils 21, and an operation of driving the sensor capacitors 22 are similar to the operations described with reference to FIGS. 5-7 and 9, descriptions thereof will be omitted.

Further, in the example shown in FIG. 13, after the calibration operation, 40 sensor coils 21 are driven first to detect the electromagnetic induction pen 30 and then the two sensor capacitors 22 are driven to detect the touch on the touch key. However, this embodiment is not limited to this example. The two sensor capacitors 22 may be driven first to detect the touch on the touch key and then the 40 sensor coils 21 may be driven to detect the electromagnetic induction pen 30.

<Modified Example of Mobile Terminal 600 on which Position Detection Device 500 is Mounted>

The example shown in FIG. 12 has a configuration in which only the sensor coils 21 are provided in the display area 602 and only the electromagnetic induction pen 30 can be detected, and only the sensor capacitors 22 are provided in the touch key 603 and the touch on the touch key can be detected. However, this embodiment is not limited to this example.

Figure 14:
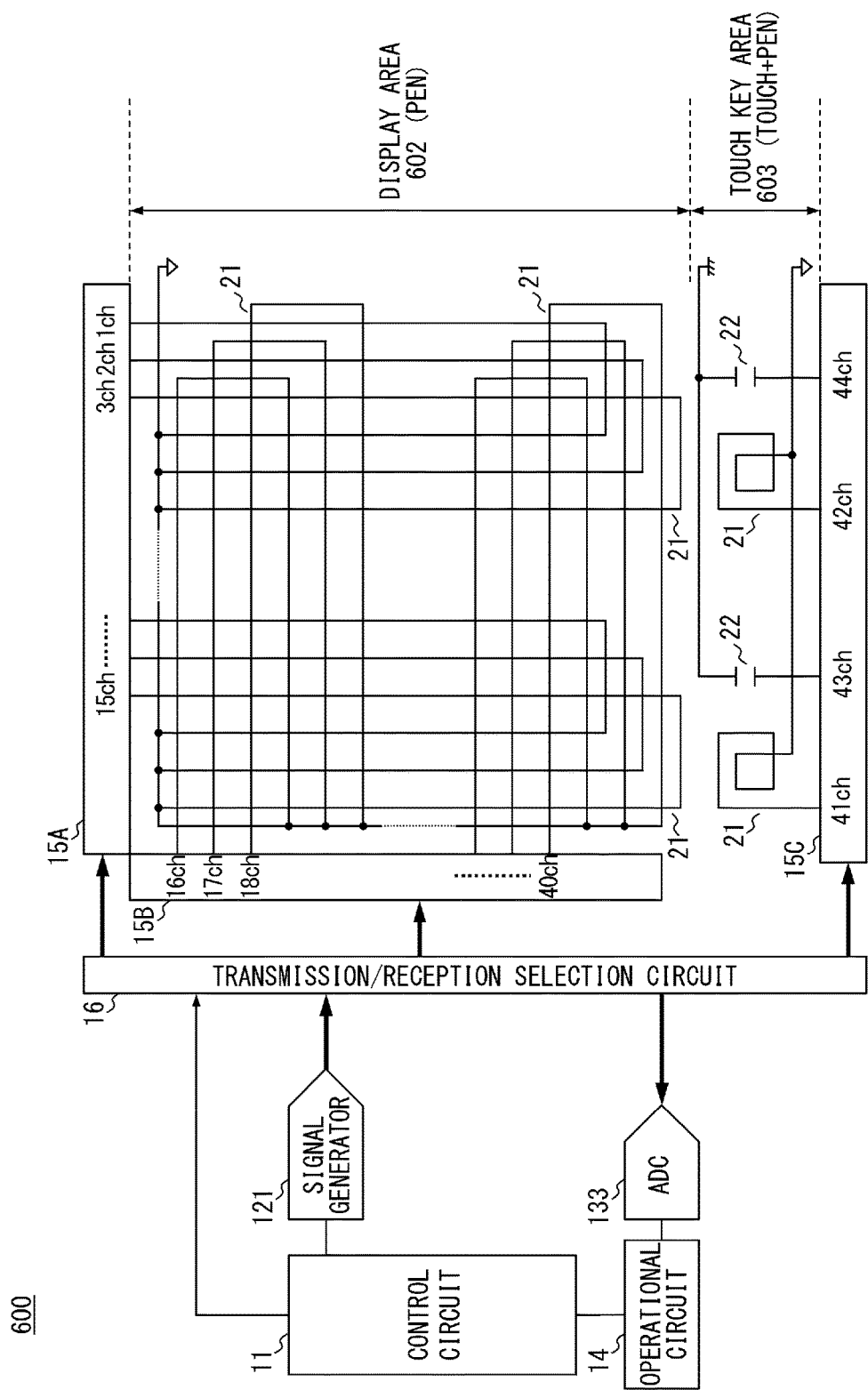
FIG. 14 is a diagram showing another example of the internal configuration of the mobile terminal on which the position detection device according to the embodiment is mounted.

As shown in FIG. 14, for example, the sensor coils 21 may be provided in both the display area 602 and the touch key area 603 and the touch key area 603 may be configured to be able to detect the electromagnetic induction pen 30. Specifically, in the example shown in FIG. 14, two sensor coils 21 are provided in the X direction in the touch key area 603. Therefore, 42 sensor coils 21 are provided in total and the two sensor capacitors 22 are provided in total. According to this configuration, the touch key area 603 can be operated either by the electromagnetic induction pen 30 or by the finger 40. Further, according to this configuration, after the calibration operation, the 42 sensor coils 21 may be driven first to detect the electromagnetic induction pen 30 and then the two sensor capacitors 22 may be driven to detect the touch on the touch key. Alternatively, the two sensor capacitors 22 may be driven first to detect the touch on the touch key and then the 42 sensor coils 21 may be driven to detect the electromagnetic induction pen 30.

Figure 15:
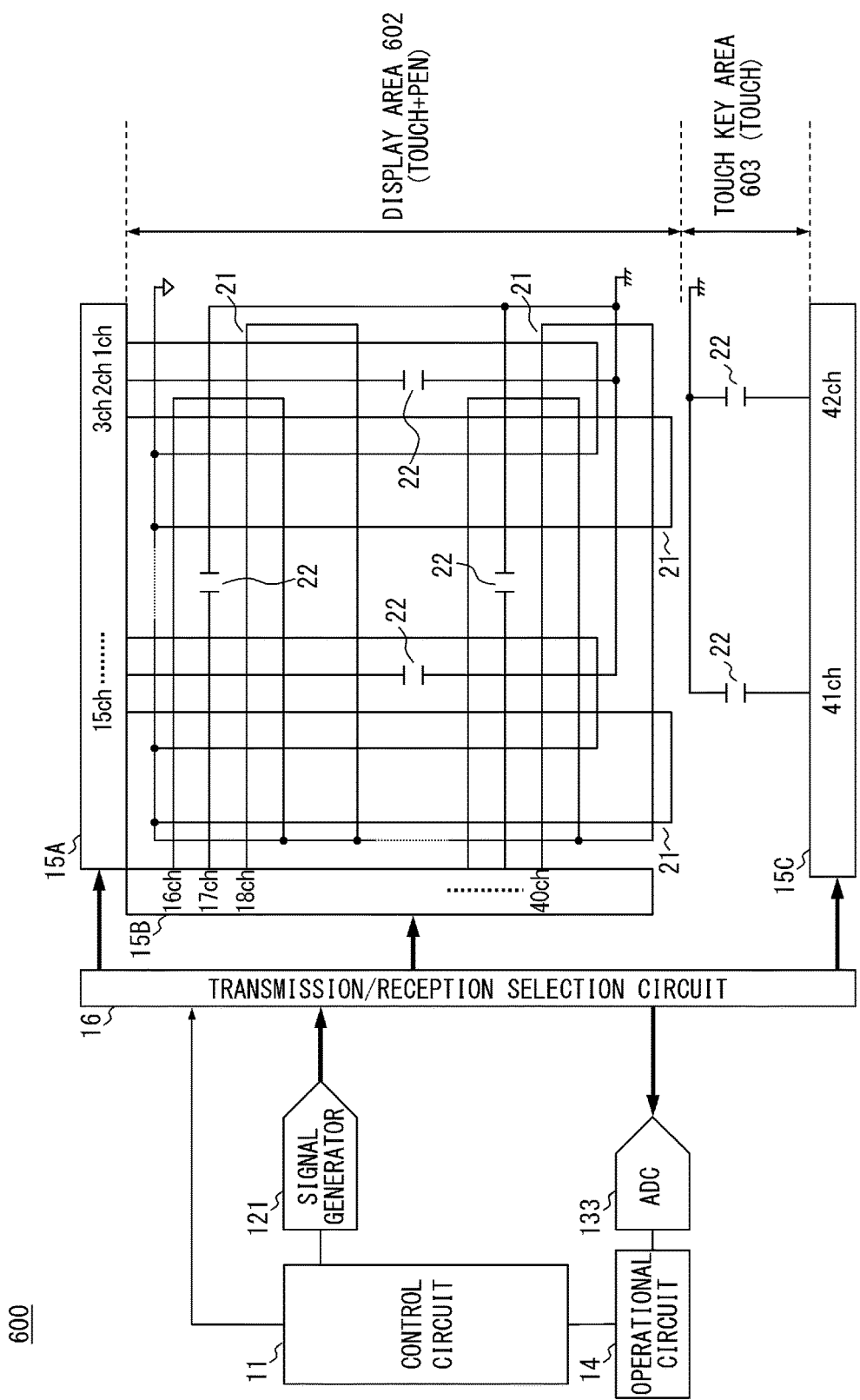
FIG. 15 is a diagram showing another example of the internal configuration of the mobile terminal on which the position detection device according to the embodiment is mounted.

Further, as shown in FIG. 15, the sensor capacitors 22 may be provided in both the display area 602 and the touch key area 603 and the display area 602 may also be configured to be able to detect the touch on the touch key. Specifically, as shown in FIG. 15, in the display area 602, four sensor coils 21 shown in FIG. 12 are replaced by the sensor capacitors 22. In FIG. 15, two sensor capacitors 22 are provided in the X direction and two sensor capacitors 22 are provided in the Y direction. Therefore, 36 sensor coils 21 are provided in total and six sensor capacitors 22 are provided in total. According to this configuration, the display area 602 can be operated either by the electromagnetic induction pen 30 or by the finger 40. Further, according to this configuration, after the calibration operation, 36 sensor coils 21 may be driven first to detect the electromagnetic induction pen 30 and then the six sensor capacitors 22 may be driven to detect the touch on the touch key. Alternatively, the six sensor capacitors 22 may be driven first to detect the touch on the touch key and then the 36 sensor coils 21 may be driven to detect the electromagnetic induction pen 30.

While not shown in the drawings, the sensor coils 21 may be provided in both the display area 602 and the touch key area 603 and the sensor capacitors 22 may be provided in both the display area 602 and the touch key area 603. According to this configuration, both the display area 602 and the touch key area 603 are able to detect the electromagnetic induction pen 30 and the touch on the touch key. Therefore, both the display area 602 and the touch key area 603 can be operated either by the electromagnetic induction pen 30 or by the finger 40. In this case, the display area 602 may be configured as shown in FIG. 15 and the touch key area 603 may be configured as shown in FIG. 14.

<Effects of Semiconductor Device 10>

As described above, the semiconductor device 10 according to this embodiment is configured to detect the change in the capacitance of the sensor capacitor 22 as a phase difference using the semiconductor device for the electromagnetic inductive position detection device according to related art and detect whether the touch key has been touched based on the phase difference.

That is, the semiconductor device 10 according to this embodiment detects the coordinates of the position indicated by the electromagnetic induction pen 30 and the writing force of the electromagnetic induction pen 30 using the amplitude value and the phase value of the signal received by the sensor coils 21. The semiconductor device 10 according to this embodiment further outputs the signal to the sensor capacitor 22, receives the signal generated at the connecting point between the sensor capacitor 22 and the transmission unit 12, and detects whether the touch key has been touched using the phase value of the signal that has been received.

Accordingly, two functions: the detection of the electromagnetic induction pen 30 and the detection of the touch on the touch key, can be achieved without adding any circuit to the semiconductor device for the electromagnetic inductive position detection device according to related art. Accordingly, the two functions can be achieved by the semiconductor device 10, that is, by one IC. Further, the number of circuits on the IC is not increased. Accordingly, it is possible to achieve the two functions by one IC without increasing the mounting area and the chip area.

While the invention made by the present inventors has been specifically described based on the embodiments, it is needless to say that the present invention is not limited to the embodiments already stated above and various changes can be made without departing from the spirit of the present invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device that is connected to a sensor configured to comprise a plurality of sensor coils and at least one sensor capacitor, the semiconductor device comprising:
   a transmission unit;
   a reception unit; and
   an operational circuit, wherein
   when the sensor comprises a plurality of sensor coils provided in a position detection direction of a position indicator, at a time the plurality of sensor coils are driven, the reception unit sequentially selects the plurality of sensor coils and receives a signal from the position indicator via the sensor coil that has been selected, and the operational circuit detects, using an amplitude value and a phase value of the signal received by the reception unit via each of the plurality of sensor coils, coordinates of a position indicated by the position indicator and a writing force of the position indicator, and
   when the sensor comprises a sensor capacitor provided in a position corresponding to a touch key, at a time the sensor capacitor is driven, the transmission unit outputs a signal to the sensor capacitor, the reception unit receives a signal generated at a connecting point between the sensor capacitor and the transmission unit, and the operational circuit detects whether the touch key corresponding to the sensor capacitor has been touched using a phase value of the signal received by the reception unit,
   wherein at a time of calibration, which is performed before the plurality of sensor coils and the sensor capacitor are driven, the transmission unit outputs a signal to the reception unit, the reception unit receives the signal output from the transmission unit, and the operational circuit holds a phase value of the signal received by the reception unit as a phase reference value, and
   wherein at the time the sensor capacitor is driven, the operational circuit detects whether the touch key corresponding to the sensor capacitor has been touched using a phase difference between the phase value of the signal generated at the connecting point between the sensor capacitor and the transmission unit and received by the reception unit and the phase reference value.

2. The semiconductor device according to claim 1, wherein when the sensor comprises a plurality of sensor capacitors provided in positions corresponding to a plurality of respective touch keys, at a time the plurality of sensor capacitors are driven, the transmission unit sequentially selects the plurality of sensor capacitors, outputs a signal to the sensor capacitor that has been selected, the reception unit receives a signal generated at a connecting point between the sensor capacitor that has been selected and the transmission unit, and the operational circuit detects whether the touch key corresponding to the sensor capacitor that has been selected has been touched using the phase value of the signal received by the reception unit.

3. The semiconductor device according to claim 1, wherein at the time the sensor capacitor is driven, the operational circuit detects whether the touch key corresponding to the sensor capacitor has been touched by comparing the phase difference with a threshold.

4. The semiconductor device according to claim 1, wherein at a time the plurality of sensor coils are driven, the operational circuit detects the coordinates of the position indicated by the position indicator using the amplitude value of the signal received by the reception unit via each of the plurality of sensor coils and detects the writing force of the position indicator using a phase difference between the phase value of the signal received by the reception unit via each of the plurality of sensor coils and the phase reference value.

5. A semiconductor device that is connected to a sensor configured to comprise a plurality of sensor coils and at least one sensor capacitor, the semiconductor device comprising:
   a transmission unit;
   a reception unit; and
   an operational circuit, wherein
   when the sensor comprises a plurality of sensor coils provided in a position detection direction of a position indicator, at a time the plurality of sensor coils are driven, the reception unit sequentially selects the plurality of sensor coils and receives a signal from the position indicator via the sensor coil that has been selected, and the operational circuit detects, using an amplitude value and a phase value of the signal received by the reception unit via each of the plurality of sensor coils, coordinates of a position indicated by the position indicator and a writing force of the position indicator, and
   when the sensor comprises a sensor capacitor provided in a position corresponding to a touch key, at a time the sensor capacitor is driven, the transmission unit outputs a signal to the sensor capacitor, the reception unit receives a signal generated at a connecting point between the sensor capacitor and the transmission unit, and the operational circuit detects whether the touch key corresponding to the sensor capacitor has been touched using a phase value of the signal received by the reception unit,
   wherein at a time of calibration, which is performed before the plurality of sensor coils and the sensor capacitor are driven, the transmission unit outputs a signal to the reception unit, the reception unit receives the signal output from the transmission unit, and the operational circuit holds a phase value of the signal received by the reception unit as a phase reference value, wherein the transmission unit comprises:

a signal generator that generates a voltage signal;

a first current driver that converts the voltage signal generated by the signal generator into a current signal; and a conversion circuit that converts the current signal converted by the first current driver into a voltage signal, and at the time the sensor capacitor is driven, the transmission unit outputs the voltage signal after the conversion by the conversion circuit to the sensor capacitor.

6. The semiconductor device according to claim 5, wherein the transmission unit further comprises a second current driver that converts the voltage signal generated by the signal generator into a current signal, at the time of the calibration, the transmission unit outputs the voltage signal after the conversion by the conversion circuit to the reception unit, at a time the plurality of sensor coils are driven, the transmission unit sequentially selects the plurality of sensor coils, transmits the current signal converted by the second current driver to the position indicator via the sensor coil that has been selected, and the reception unit sequentially selects the sensor coil that has been selected by the transmission unit and receives the voltage signal from the position indicator via the sensor coil that has been selected.

7. The semiconductor device according to claim 1, wherein when the sensor comprises the plurality of sensor coils and the sensor capacitor, the plurality of sensor coils are driven to detect the coordinates of the position indicated by the position indicator and the writing force of the position indicator and then the sensor capacitor is driven to detect whether the touch key corresponding to the sensor capacitor has been touched.

8. The semiconductor device according to claim 1, wherein when the sensor includes the plurality of sensor coils and the sensor capacitor, the sensor capacitor is driven to detect whether the touch key corresponding to the sensor capacitor has been touched and then the plurality of sensor coils are driven to detect the coordinates of the position indicated by the position indicator and the writing force of the position indicator.

9. The semiconductor device according to claim 1, wherein the sensor comprises the plurality of sensor coils and the sensor capacitor, the plurality of sensor coils are provided in a first area, and the sensor capacitor is provided in a second area different from the first area.

10. The semiconductor device according to claim 1, wherein the sensor comprises the plurality of sensor coils and the sensor capacitor, the plurality of sensor coils are provided in both a first area and a second area different from the first area, and the sensor capacitor is provided in one of the first area and the second area.

11. The semiconductor device according to claim 1, wherein the sensor comprises the plurality of sensor coils and a plurality of sensor capacitors provided in positions corresponding to a plurality of respective touch keys, the plurality of sensor capacitors are provided in both a first area and a second area different from the first area, and the plurality of sensor coils are provided in one of the first area and the second area.

12. The semiconductor device according to claim 1, wherein the sensor comprises the plurality of sensor coils and a plurality of sensor capacitors provided in positions corresponding to a plurality of respective touch keys, the plurality of sensor coils are provided in both a first area and a second area different from the first area, and the plurality of sensor capacitors are provided in both the first area and the second area.

13. A control method of a semiconductor device comprising a transmission unit, a reception unit and an operational circuit and connected to a sensor configured to comprise a plurality of sensor coils and a sensor capacitor, wherein when the sensor comprises a plurality of sensor coils provided in a position detection direction of a position indicator, at a time the plurality of sensor coils are driven, the plurality of sensor coils are sequentially selected, a signal from the position indicator is received via the sensor coil that has been selected, and coordinates of a position indicated by the position indicator and a writing force of the position indicator are detected using an amplitude value and a phase value of the signal received via each of the plurality of sensor coils, and when the sensor comprises a sensor capacitor provided in a position corresponding to a touch key, at a time the sensor capacitor is driven, a signal is output from a transmission unit to the sensor capacitor, a signal generated at a connecting point between the sensor capacitor and the transmission unit is received, and it is detected whether the touch key corresponding to the sensor capacitor has been touched using a phase value of the signal that has been received, wherein at a time of calibration, which is performed before the plurality of sensor coils and the sensor capacitor are driven, the transmission unit outputs a signal to the reception unit, the reception unit receives the signal output from the transmission unit, and the operational circuit holds a phase value of the signal received by the reception unit as a phase reference value, and wherein at the time the sensor capacitor is driven, the operational circuit detects whether the touch key corresponding to the sensor capacitor has been touched using a phase difference between the phase value of the signal generated at the connecting point between the sensor capacitor and the transmission unit and received by the reception unit and the phase reference value.

* * * * *